United States Patent [19]

Schmitt et al.

[11] Patent Number: 5,541,252
[45] Date of Patent: Jul. 30, 1996

[54] METHOD OF MANUFACTURING WATER-SOLUBLE POLYMER DISPERSIONS HAVING HIGH POLYMER CONTENT

[75] Inventors: Gunter Schmitt; Joachim Carl, both of Darmstadt; Manfred Braum, Mainz-Gonsenheim; Peter Quis, Darmstadt; Petra Schliessmann, Darmstadt, all of Germany

[73] Assignee: Röhm GmbH, Darmstadt, Germany

[21] Appl. No.: 411,668

[22] PCT Filed: Oct. 14, 1994

[86] PCT No.: PCT/DE94/01214

§ 371 Date: Apr. 12, 1995

§ 102(e) Date: Apr. 12, 1995

[87] PCT Pub. No.: WO95/11269

PCT Pub. Date: Apr. 27, 1995

[30] Foreign Application Priority Data

Oct. 19, 1993 [DE] Germany .................. 43 35 567.6

[51] Int. Cl.⁶ .................. C08L 33/00; C08J 3/03
[52] U.S. Cl. .................. 524/555; 524/556; 524/815; 524/817; 524/828; 524/829; 524/831; 523/132; 523/335; 523/340
[58] Field of Search .................. 523/340, 333, 523/335, 132; 524/555, 828, 829, 837, 815, 817

[56] References Cited

U.S. PATENT DOCUMENTS 4,021,399  5/1977  Hunter et al. .................. 523/340
4,052,353  10/1977  Scanley .................. 524/555
4,435,528  3/1984  Domina .................. 524/831
5,403,883  4/1995  Messner et al. .................. 524/555

FOREIGN PATENT DOCUMENTS 0262945  4/1988  European Pat. Off. .

*Primary Examiner*—Tae Yoon
*Attorney, Agent, or Firm*—Oblon, Spivak, McClelland, Maier & Neustadt P.C.

[57] ABSTRACT

The invention relates to a process for the preparation of low viscous, water soluble polymer dispersions on an aqueous basis with a high concentration of the active substance, containing a polymerizate A) synthesized from the monomeric components, hydrophobic monomers and optionally amphiphilic monomers, which exhibit an average molecular weight $M_w$ of at least $5 \times 10^5$ Dalton and contain at least one polymeric dispersing agent D), where in a first step an aqueous dispersion PD) is prepared from the polymerizate A) and at least one polymeric dispersing agent D); in a second step an aqueous, highly concentrated dispersion PD') is prepared from the aqueous dispersion PD) by extracting the water; and in a third step an aqueous dispersion PD") with a high content of the active substance is prepared through the addition of an aqueous dispersion of at least one polymeric dispersing agent D) to the concentrated dispersion PD'), and where the second and third process step can be repeated in succession.

12 Claims, No Drawings

METHOD OF MANUFACTURING WATER-SOLUBLE POLYMER DISPERSIONS HAVING HIGH POLYMER CONTENT

FIELD OF THE INVENTION

The invention relates to an at least three step process for increasing the content of the active substance during the production of low viscosity, water soluble polymer dispersions PD with a high content of the active substance, containing at least one polymeric dispersing agent D) and one polymerizate A) comprising a1) at least one water soluble monomer, a2) at least one hydrophobic monomer and optionally a3) at least one amphiphilic monomer.

STATE OF THE ART

Aqueous dispersions of water soluble polymerizates are used as flocculating agents during waste water treatment, as de-watering agents following the separation of the aqueous phase, as retention agents during the production of paper, as soil conditioners or as dispersing agents.

The EP 170 394 describes a fluid, which can be mixed with water and comprises particles, constructed from a high molecular polymer gel, which exhibits particle sizes exceeding 20 μm, in aqueous solution as the continuous phase, which contains an equilibrating agent, which holds the water content of the gel particles in equilibrium with the water content in the continuous phase and thus prevents the gel particles from agglomerating. The sodium salt of polyacrylic acid or polydiallyldimethylammonium chloride (poly-DAD-MAC) is used as the preferred equilibrating agent.

In the EP 183 466 a process for the preparation of a water soluble polymer dispersion is described. Said process is characterized by the polymerization of a water soluble monomer while stirring in an aqueous solution of at least one salt in the presence of a dispersing agent. In so doing, polyols, polyalkylene ethers, alkali salts of the polyacrylic acid and alkali salts of poly-2-acrylamido-2-methylpropane sulfonic acid are used as the dispersing agents.

The DE-PS 29 44 663 relates to a process for the preparation of an aqueous dispersion from a water soluble polymerizate with good stability and flowability, wherein the water soluble polymerizate contains at least one water soluble ethylenicly unsaturated monomer and wherein as the dispersing agent polyalkylene ether, polyethylene imine and other polymerizates can be present. The aqueous dispersion prepared in such a manner can be used, optionally following dilution with water, as a flocculating agent, thickening agent, soil conditioning agent and for other applications.

In the JP Kokkai 59 108 074 thickening agents are described that comprise polymerizates in aqueous solution, which contain as the monomeric component (meth)acrylic acid and/or their salts, (meth)acrylamides and methylacrylate or ethylacrylate, with polyethylene glycol as the dispersing agent.

The German patent application P 42 16 167.3 describes aqueous dispersions of water soluble polymerizates, formed through polymerization of a mixture comprising water soluble, hydrophobic and optionally amphiphilic monomers in the presence of a polymeric dispersing agent. A two step process for preparing low viscosity dispersions of water soluble polymerizates according to the German patent application P 42 16 167.3 with increased content of the active substance is included from the German patent application P 43 16 200.2.

PROBLEM AND SOLUTION

The aqueous solutions, which are described in the EP 170 394 and contain gel particles, have the drawback that after prolonged residence time, they exhibit extremely raised viscosities, which can be reduced only by using shear gradients, such as intensive stirring. The rheological properties depend on a complex equilibrium between polymerizate, equilibrating agent, water content and particle size of the gel particles.

In the EP 183 466 water soluble polymerizates as dispersions in aqueous salt solutions with the aid of a dispersing agent are claimed. The drawback with these dispersions is the high salt content of the aqueous phase (up to 30% by weight) as compared to a relatively low polymerizate (=active substance) content (up to 20% by weight), which leads to waste water problems in specific applications of such dispersions.

The high content of dispersing agent, based on the water soluble polymerizate often has a prohibitive effect on the application of aqueous dispersions according to the DE-PS 29 24 664. If such dispersions are used, for example, as flocculating agents for electrically charged particles, the effect of the high molecular ionic polymers is reduced by means of the dispersing agent, which is low molecular in comparison. Polymerizates, which are produced according to JP Kokkai 59 18 075 and exhibit a thickening effect, have average molecular weights $M_w$, between about $10^5$ and $5 \times 10^5$ Dalton (weight average), which are clearly too low for the application as a flocculating agent.

The problem, resulting from the aforementioned state of the art, to provide aqueous dispersions of aqueous polymerizates, which exhibit a low viscosity, a high content of polymerizate active substance, a high polymerizate molecular weight and a salt-free water phase, is solved by the polymers of the invention in the aqueous dispersion according to the German Patent application P 42 16 167.3. In addition, the German patent application P 43 16 200.2 provides a two step process, according to which the low viscosity, put into practice in the P 42 16 167.3, or the high content of polymerizate active substance with high molecular weight can be still further reduced (viscosity) or raised (active substance content and/or molecular weight).

Nevertheless, there is also the problem of finding still better solutions in the field of parameters—viscosity of the aqueous dispersion, high content of polymerizate active substance and high polymerizate molecular weight. It was found surprisingly that an at least three step process for increasing the active substance content during the preparation of low viscosity, water soluble polymer dispersions PD, whose synthesis corresponds to that of the polymer dispersions, as described in P 42 16 167.3, solves this problem even better than the preparation process described in the P 43 16 200.2. The process according to the invention includes the following steps:

1. Preparation of an aqueous dispersion PD of water-soluble polymerizates A) through the polymerization of different monomeric components a1), a2) and optionally a3) in the presence of a polymeric dispersing agent D) according to the P 42 16 167.3. In so doing,
   a1) stands for 99 to 70% by wt. of at least one water-soluble monomer,
   a2) stands for 1 to 30% by wt. of at least one hydrophobic monomer, and a3) stands for 0 to 20% by wt., preferably 0.1 to 15% by wt., of at least one amphiphilic monomer, and the water-soluble polymerizates A) exhibit an average molecular weight $M_w$ (weight average) of at least $10^6$ Dalton. Then an aqueous dispersion is eventually added, according to P 43 16 200.2, to at least one polymeric dispersing agent (D). Preferably polyelectrolytes, which exhibit average molecular weights of $M_w < 5 \times 10^5$ Dalton and are incompatible with the dispersed polymerizate A), or polyalkylene ether are added as the polymeric dispersing agents D).

2. In the second step water is withdrawn from the aqueous polymer dispersion PD), prepared according to P 42 16 167.3 or P 43 16 200.2, until its viscosity corresponds to the viscosity of polymer dispersions, obtained according to P 42 16 167.3. This can be done, for example, through distillation at normal pressure or in a vacuum.

3. The third step of the process according to the invention includes in turn the addition of an aqueous dispersion of at least one polymeric dispersing agent D), which corresponds to the criteria of the dispersing agent used in step 1.

With the steps 2 and 3, which exhibit the invention and belong to the process described here, the active substance contents of aqueous polymer dispersions, as prepared according to P 43 16 200.2, can be clearly increased, for example, by about 50%.

In preferred embodiments of the invention at least one of the water soluble monomers a1) exhibits at least one ionic group, and/or the hydrophobic monomer a2) is a compound of formula I:

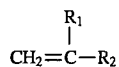
(I)

where $R_1$ can stand for hydrogen or methyl $R_2$ can stand for alkyl having 1 to 4 carbon atoms, for cycloalkyl having 5 to 12 carbon atoms, for aryl having 6 to 12 carbon atoms, or for $$-\underset{\underset{O}{\|}}{C}-Z-R_3$$

with $R_3$ for alkyl having 1 to 8 carbon atoms and Z can stand for O, —NH or —NR$_3$.

By aryl is understood in particular phenyl or naphthyl, which may or may not be substituted with C1 to C4 alkyl groups.

The amphiphilic monomer a3) is preferably a compound of the formula II:

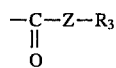
(II)

where $A_1$ can stand for O, NH, NR$_4$ with $R_4$ for alkyl having 1 to 4 carbon atoms, $R_5$ can stand for hydrogen or methyl, $R_6$ can stand for alkylene having 1 to 6 carbon atoms, $R_7$ and $R_8$ can stand independently of each other for alkyl having 1 to 6 carbon atoms, $R_9$ can stand for alkylene having 1 to 6 carbon atoms, $R_{10}$ can stand for alkyl having 8 to 32 carbon atoms, and X can stand for halogen, pseudohalogen, SO$_4$CH$_3$, acetate where pseudohalogen stands for —CN—, —OCN— and —SCN— groups, or a compound of the formula III:

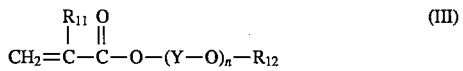
(III)

where $R_{11}$ can stand for hydrogen or methyl $R_{12}$ can stand for alkyl having 8 to 32 carbon atoms, Y can stand for alkylene having 2 to 6 carbon atoms and n can stand for a whole number between 1 and 50.

IMPLEMENTATION OF THE INVENTION

Salts of acrylic and/or methacrylic acid of the general formula IV can be used, for example, as the monomer a1):

(IV)

where

R' can stand for hydrogen or methyl and $Q^\oplus$ can stand for alkali metal ions, as such Na$^\oplus$ or K$^\oplus$, ammonium ions, such as NH$_4^\oplus$, $^\oplus$NR''$_2$H$_2$, $^\oplus$NR''$_3$H or $^\oplus$NR''$_4$ with R''=akyl having 1 to 6 carbon atoms, or other monovalent, positively charged ions.

Monomers a1) of the formula IV include, for example, sodium (meth) acrylate, potassium (meth) acrylate or ammonium (meth) acrylate.

Furthermore, the acrylic and/or the methacrylic acid itself can be used, for example, as the monomer component a1), as well as methacrylamide of formula V:

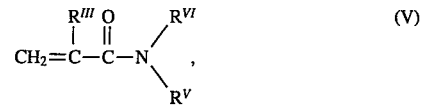
(V)

where $R^{III}$ can stand for hydrogen or methyl, and $R^{IV}$ and $R^V$ can stand independently of each other for hydrogen, for alkyl having 1 to 5 carbon atoms.

Examples of the monomers a1) of the formula V are: (meth)acrylamide, N-methyl(meth)acrylamide, N,N-dimethyl(meth)acrylate, N,N-diethy(meth)acrylamide, N-methyl-N-ethyl(meth)acrylamide as well as N-hydroxyethyl-(meth)acrylamide. For the preparation of (meth)acrylamides confer, for example, Kirk-Othmer, Encyclopedia of Chemical Technology, vol. 15, pages 346 to 376, 3rd ed., Wiley Interscience, 1981.

Furthermore, monomers of the formula VI can be used as the monomer component a1):

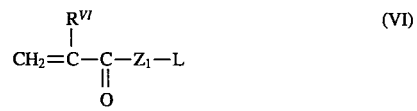
(VI)

where $R^{VI}$ stands for hydrogen or methyl

L stands for groups

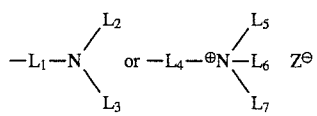

and $Z_1$ can stand for O, NH or $NR_4$ where $L_1$ and $L_4$ can stand for an alkylene group or hydroxyalkylene group having 2 to 6 carbon atoms, $L_2$, $L_3$, $L_5$, $L_6$ and $L_7$ can stand for an alkyl group having 1 to 6 carbon atoms, and Z can stand for halogen, acetate, $SO_4CH_3$.

Examples of the monomers a1) of formula VI are: 2-(N,N-dimethylamino)ethyl(meth)acrylate, 3-(N,N-dimethylamino)propyl(meth)acrylate, 4-(N,N-dimethylamino)butyl(meth)acrylate, 2-(N,N-diethylamino)ethyl(meth)acrylate, 2-hydroxy-3-(N,N-dimethylamino)propyl(meth)acrylate, 2-(N,N,N-trimethylammonium)ethyl(meth)acrylate-chloride, 3-(N,N,N-trimethylammonium)propyl(meth)acrylate-chloride, or 2-hydroxy-3-(N,N,N-trimethylammonium)propyl(meth) acrylate chloride, or the (meth)acrylamide of the aforementioned compounds, such as 2-dimethylaminoethyl-(meth)acrylamide, 3-dimethylaminopropyl(meth)acrylamide or 3-trimethylammoniumpropyl(meth)acrylamide chloride. Moreover, ethylenically unsaturated monomers, which are capable of forming water soluble polymers, can be used as the monomeric component a1); examples are vinylpyridine, N-vinylpyrrolidone, styrene sulfonic acid, N-vinyl imidazole or diallyldimethylammonium chloride. At the same time, combinations of different water soluble monomers cited under a1) are also possible. For the isolation of (meth)acrylammonium salts confer, for example, Kirk-Othmer, Encyclopedia of Chemical Technology, vol. 15, pages 346 to 376, 3rd ed., Wiley Interscience, 1987.

Hydrophobic monomers a2) can be, for example, monomers of the formula I:

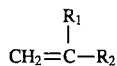

where $R_1$ can stand for hydrogen or alkyl having 1 to 5 carbon atoms and $R_2$ can stand for alkyl having 1 to 4 carbon atoms, for cycloalkyl having 5 to 12 carbon atoms, for aryl having 6 to 12 carbon atoms, or for

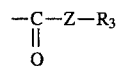

with $R_3$ for alkyl having 1 to 8 carbon atoms, for cycloalkyl having 5 to 12 carbon atoms or for aryl having 6 to 12 carbon atoms and Z can stand for O, NH or $NR_3$.

Examples are: styrene, α-methylstyrene, p-methylstyrene, p-vinyltoluene, vinylcyclopentane, vinylcyclohexane, vinylcyclooctane, isobutene, 2-methylbutene-1, hexene-1, 2-methylhexene-1, 2-propylhexene-1, ethyl(meth)acrylate, propyl(meth)acrylate, isopropyl(methy)acrylate, butyl(meth)arylate, isobutyl(meth)acrylate, pentyl(meth)acrylate, hexyl(meth)acrylate, heptyl(meth)acrylate, octyl(meth)acrylate, cyclopentyl(meth)acrylate, cyclohexyl(meth)acrylate, 3,3,5-trimethylcyclohexyl(meth)acrylate, cyclooctyl(meth)acrylate, phenyl(meth)acrylate, 4-methylphenyl(meth)acrylate, 4-methoxyphenyl(meth)acrylate. Furthermore, ethylene, vinylidene chloride, vinylidene fluoride, vinyl chloride or other predominantly (ar)aliphatic compounds with polymerizable double bonds can be used as hydrophobic monomers a2). At the same time combinations of different hydrophobic monomers cited under a2) are also possible. Amphiphilic monomers a3) can be, for example, monomeric compounds of formula II or III:

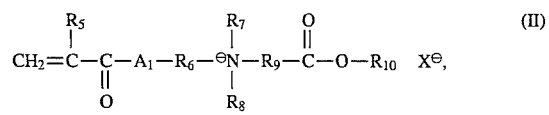

where $A_1$ can stand for O, NH, $NR_4$ with $R_4$ for alkyl having 1 to 4 carbon atoms, $R_5$ can stand for hydrogen or methyl, $R_6$ can stand for alkylene having 1 to 6 carbon atoms, $R_7$ and $R_8$ can stand independently of each other for alkyl having 1 to 6 carbon atoms, $R_9$ can stand for alkylene having 1 to 6 carbon atoms, $R_{10}$ can stand for alkyl, aryl and/or aralkyl having 8 to 32 carbon atoms, and X can stand for halogen, pseudohalogen, $SO_4CH_3$ or acetate.

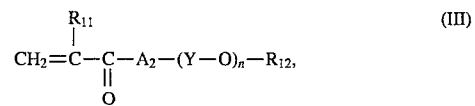

where $A_2$ can stand for O, NH, $NR_{13}$ with $R_{13}$ for alkyl having 1 to 4 carbon atoms, $R_{11}$ can stand for hydrogen or methyl, $R_{12}$ can stand for alkyl, aryl and/or aralkyl having 8 to 32 carbon atoms, Y can stand for alkylene having 2 to 6 carbon atoms and n can stand for a whole number between 1 and 50.

To prepare amphiphilic monomers of formula III confer, for example, Kirk-Othmer, Encyclopedia of Chemical Technology, vol. 1, 3rd ed., pages 330 to 354 (1978) and vol. 15, pages 346 to 376 (1981), Wiley Interscience.

Examples of the monomers of formula II are:

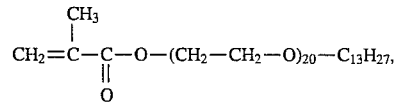

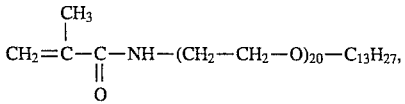

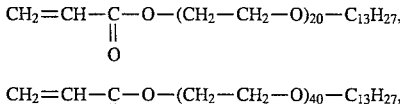

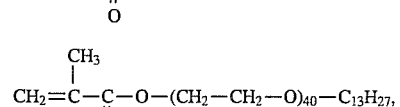

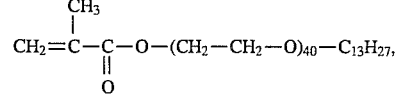

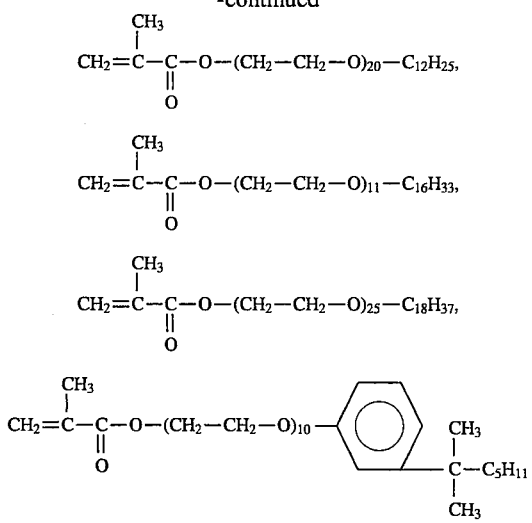

Moreover, the following can be added, for example, as amphiphilic monomers a3):

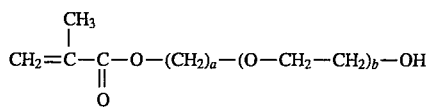

with a=6 to 15 and b=1 to 50

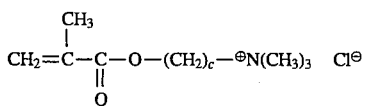

with c=6 to 18

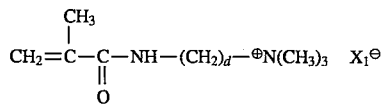

with $X_1^{\ominus}=Cl^{\ominus}$ or $SO_4CH_3^{\ominus}$ and
d=6 to 18

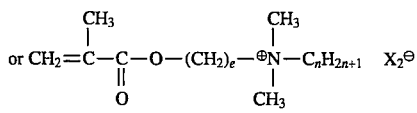

with 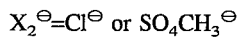 and n=6 to 18

$X_2^{\ominus}=Cl^{\ominus}$ or $SO_4CH_3^{\ominus}$

At the same time, combinations of different amphiphilic monomers cited under a3) are also possible.

The polymeric dispersing agent D)

The polymeric dispersing agent differs significantly in the chemical composition and in the average molecular weight $M_w$ (weight average) from the water soluble polymerizate, comprising the monomeric mixture A), the polymeric dispersing agent D) being incompatible with the water soluble polymerizate. The average molecular weights $M_w$ of the polymeric dispersing agents range from $10^3$ to $5\times10^5$ Dalton, preferably from $10^4$ to $4\times10^5$ Dalton (to determine the $M_w$ confer H. F. Mark et al., Encyclopedia of Polymer Science and Technology, vol. 10, pages 1 to 19, J. Wiley, 1987).

The polymeric dispersing agents D) contain at least one functional group selected from ether, hydroxyl, carboxyl, sulfon, sulfate ester, amino, amido, imido, tert. amino and/or quaternary ammonium groups. Examples of the polymerizates D) are: cellulose derivatives, polyethylene glycol, polypropylene glycol, copolymerizates from ethylene gylcol and propylene glycol, polyvinyl acetate, polyvinyl alcohol, starches and starch derivatives, dextran, polyvinylpyrrol idone polyvinylpyridine polyethylene imine, polyvinylimidazole, polyvinyl succinimide, polyvinyl-2-methylsuccinimide, polyvinyl-1,3-oxazolidone-2, polyvinyl-2-methylimidazoline, and copolymerizates, which can contain, besides combinations from the monomeric units of the aforementioned polymerizates, for example the following monomer units: maleic acid, maleic acid anhydride, fumaric acid, itaconic acid, itaconic acid anhydride, (meth)acrylic acid, salts of (meth)acrylic acid or (meth)acrylamide compounds. Preferably polyalkylene ethers, such as polyethylene glycol, polypropylene glycol or polybutylene-1,4-ether, are added as the polymeric dispersing agents D). To prepare polyalkylene ethers confer, for example, Kirk-Othmer, Encyclopedia of Chemical Technology, 3rd ed., vol. 18, pages 616 to 670, 1982, Wiley Interscience.

Especially polyelectrolytes, such as polymerizates, containing monomeric units such as salts of (meth)acrylic acid as the anionic monomeric units or derivatives, which are quaternized with methyl chloride and belong to N,N-dimethylaminoethyl(meth)acrylate, N,N-dimethylaminopropyl-(meth)acrylate or N,N-dimethylaminohydroxypropyl-(meth)acrylate or N,N-dimethylaminopropyl(meth)acrylamide, are added preferably as the polymeric dispersing agents D). In particular poly(diallydimethylammonium chloride) (poly-DADMAC) having an average molecular weight $M_w$, ranging from $5\times10^4$ to $4\times10^5$ Dalton is added preferably as the polymeric dispersing agent. To prepare polyelectrolytes confer, for example, Kirk-Othmer, Encyclopedia of Chemical Technology, 3rd. ed. vol. 18, pages 495 to 530, 1982, Wiley Interscience.

Furthermore, low molecular emulsifiers with a molecular weight <$10^3$ Dalton can be added in amounts ranging from 0 to 5% by wt., based on the polymer dispersion.

The three step preparation process
First step:
Preparation and eventual dilution of aqueous polymer dispersion PD) containing polymerizate A) and polymeric dispersing agent D)

The amount of the monomeric mixture a1), a2) and optionally a3), based on 100 parts by weight of water, as the reaction medium ranges in general from 5 to 80 parts by weight, preferably 10 to 50 parts by wt. If monomers a1) and optionally a3) are added as the aqueous solution, the water content is added to the reaction mixture.

The amount of polymeric dispersing agent D), based on 100 parts by weight, as the reaction medium ranges in general from 1 to 50 parts by weight, preferably 2 to 40 parts by weight, and in particular preferably 5 to 30 parts by weight.

To start the polymerization, radical initiators (=polymerization starters) or highly energetic radiation, such as ultraviolet light, are used for example. Preferably 2,2'-azobisisobutyronitrile, 2,2'-azobis (2-amidopropane)dihydrochloride (preferably dissolved in dimethyl formamide) potassium persulfate, ammonium persulfate, hydrogen peroxide, optionally in combination with a reductive agent, such as an amine or sodium sulfite, are added for example, as the radical initiators. The content of initiator, based on the monomeric mixture a1), a2 ) and optionally a3 ), ranges usually from $10^{-3}$ to 5% by wt., preferably $10^{-2}$ to 1% by wt., whereby at the start of polymerization all or a part of the initiator can be added with the following dosage over the entire polymerization process. Similarly all of the monomeric mixture a1), a2), and optionally a3) can be added at the start of polymerization or partially as inflow over the entire polymerization process. The polymerization temperature ranges in general from 0° to 100° C., preferably 30° to 60° C. Preferably polymerization occurs under an inert gas atmosphere, for example, nitrogen atmosphere. The final conversion of the polymerization exceeds 98% by wt. of the added monomeric mixture a1), a2) and optionally a3), for which a period of polymerization ranging in general from 1 to 8 hours is necessary.

For an eventual additional addition of the polymeric dispersing agent D), which is added preferably in an aqueous dispersion, to the aqueous dispersion of the polymerizate A) according to P 43 16 200.2, both motionless and also dynamic mixers can be used. While the former act by generating turbulence, produced in the liquid mixture while flowing through the mixers, the turbulence in dynamic mixers is produced actively (cf. to this end, for example, R ömpps Chemielexikon, 9th ed., page 2805, Georg Thieme, Stuttgart, New York, 1991). Preferably mixers, such as propeller, tilted blade, disk, impeller, cross-blade, gate paddle, anchor, screw or spiral agitators are used, whereby mixers that produce a slight shear gradient during the mixing operation are especially preferred (cf. to this end, for example, Chemielexikon, 9th ed., pages 3939 to 3940, Georg Thieme, Stuttgart, New York, 1992). During the mixing operation, the aqueous dispersion of the polymerizates a) is preferably introduced; and then the polymeric dispersing agent D), which is added preferably into an aqueous dispersion, is added step-by-step while stirring. In so doing, the viscosity of the mixture is constantly monitored. In an especially preferred embodiment of the invention the aqueous dispersion of the polymerizate is heated to 30° up to 90° C., preferably 40° up to 70° C., in order to keep the viscosity as low as possible during the mixing procedure.

Second Step

Reduction of the water content of the aqueous polymer dispersion PD) produced according to step 1

The water content of the polymer dispersion PD prepared according to step 1 is reduced preferably through evaporation of the water. This process can take place, for example, by removing the water through distillation, a procedure that is carried out preferably at reduced pressure or in a vacuum. The distillation apparatuses used during this procedure are well-known, such as the distillation columns (cf. to this end, e.g., Kirk-Othmer, Encyclopedia of Chemical Technology, 3rd ed., vol. 7, pages 849 to 891, J. Wiley, New York, 1979). Other evaporation units are, for example, convection evaporators or thin layer evaporators (cf. to this end, e.g., Kirk-Othmer, Encyclopedia of Chemical Technology, 3rd ed., vol. 9, pages 472 to 493, J.Wiley, New York, 1980). Also such methods as membrane diffusion or the bonding of water with organic or inorganic reagents are possible.

The water content of the polymer dispersion PD) prepared according to step 1 can be reduced in this manner, as long as the viscosity of the resulting polymer dispersion with reduced water content PD') allows a technologically reasonable handling and as long as it allows the dispersion stability. In general polymer dispersions PD') with an active substance content of up to 50% by wt. or slightly higher are possible.

Third step

Addition of the polymeric dispersion agent D) in aqueous dispersion

The polymeric dispersing agent D) in aqueous dispersion is added as in step 1 according to P 43 16 200.2 with motionless or dynamic mixing units. Again mixers are preferred that produce a slight shear gradient during the stirring operation. During the stirring operation the aqueous dispersion of the polymerizate A) and polymeric dispersing agent D) that are prepared according to step 2 of the process according to the invention are introduced with reduced water content; and then other portions of the polymeric dispersing agent D) in aqueous dispersion are added step-by-step while stirring, during which process the viscosity of the mixture is constantly monitored. As described in step 1, the aqueous dispersion according to step 2 is heated to 30° C. up to 90° C., preferably to 40° up to 70° C., in order to keep the viscosity as low as possible during the mixing operation.

The results are polymer dispersions PD") with very high active substance contents at comparatively very low viscosity. Thus, the active substance content of a polymer dispersion PD"), which represents the sum of the contents of polymerizate A) and polymeric dispersing agent D), can be doubled by means of the process, for example, at constant viscosity, based on the viscosity of the polymer dispersion PD).

Advantageous effects of the invention

The polymer dispersions PD") prepared according to the process of the invention are characterized with respect to the active substance concentration, whereby the active substance comprises the combination of polymerizate A) and dispersing agent D), and the average molecular weight of the polymerizate A) by means of surprisingly low viscosity, as compared to the polymer dispersions PD). When the aqueous polymer dispersion PD") is diluted, the actual viscosity rises to a very high maximum, whereby the system becomes clear. In so doing, the viscosities of the aqueous polymer solutions are at 1% by wt. of polymerizate content on a high level, whereby the dispersing agent D) poly-DADMAC that is preferably added functions simultaneously as the active substance, i.e. as the interceptor of the disturbing substance while the water circulates and to facilitate the formation of flocs, for example, during the sewage sludge coagulation.

Another advantageous feature of the aqueous polymer dispersion PD") according to the invention is the high shear and stability. Thus, the high viscosity of an aqueous solution with 1% by wt. of polymerizate content also remains largely constant even after prolonged stirring.

The absence of organic solvents guarantees reliable handling (for example: no flammability) and an ecologically safe usage of the polymer dispersions PD") according to the invention, for example, as thickening agents, flocculating aids for electrically charged suspended particles, as retention agents for the manufacture of paper and/or as soil conditioners. In an isolated form or in a form with little water the polymerizate according to the invention can be used as a dewatering agent, for example, in the field of hygiene.

The following examples shall explain the invention. The physical data were determined with the aid of the following standards.

Dynamic viscosity η [Pa.s] in accordance with DIN 53 018/53 019

Molecular weight $M_w$ per gel permeation chromatography (cf., e.g., H. F. Mark et al.: see above) with standard poly(2-trimethylammonium ethyl acrylate chloride)

Stammberge value STB II (S): determination of the chronological course of kaolin sedimentation for flocculating agent-containing solutions according to the flocculating process: 20 g of kaolin per liter of tap water (20° DH) are suspended and maintained homogeneously while stirring. Then 250 ml of kaolin suspension are filled into a 250 ml measuring cylinder and maintained homogeneously while stirring. To meter 1 ml of 0.1% aqueous solution of the polymer dispersion PD" (active substance content), the stirring is interrupted. Then the mixture is stirred for 15 seconds and thereafter the stirring is suspended. Subsequently the time is taken for the sedimentation level to drop by 4 cm in the measuring cylinder, which corresponds to the Stammberge value STBII.

EXAMPLES

Example 1

315.0 g of a 40% aqueous polydiallydimethylammonium chloride(poly-DADMAC) solution, 67.5 g of acrylamide, 93.8 g of a 80% aqueous 2-trimethylammonium ethyl acrylate chloride solution, 7.5 g of lauryl acrylate and 516.2 g of water are degased in a reaction vessel with $N_2$ and heated to 53° C. while stirring. Then 0.015 g of 2,2'-azobis[2-(2-imidazoline-2-yl)-propane] (AIP), dissolved in 0.135 g of water, are added. After three hours of stirring, the temperature is raised to 65° C. and another 0.15 g AIP, dissolved in 1.35 g of water, are added.

The polymerization is terminated after another hour.

The system is characterized by the following variables:

The dynamic viscosity of the aqueous polymer dispersion is $\eta_1$=11,550 mPa.s.

The dynamic viscosity of a 1% aqueous solution of the polymerizate is $\eta_2$=1,616 mPa.s.

The flocculation value is: STB II=8.5 s.

The molecular weight of the polymerizate is $M_w$>$10^6$ Dalton.

Dry content: 27.6%.

The finished product is diluted by adding 98.9 g of poly-DADMAC. The polymer dispersion obtained is characterized by the following variables:

dynamic viscosity of the product: $\eta_1$=6,400 mPa.s.

dynamic viscosity of 1% solution of the polymerizate in water: $\eta_2$=1,296 mPa.S.

flocculation value: STB II=7.8 s.

dry content: 28.7%.

Water is extracted from this polymer dispersion by means of vacuum distillation. The distillation conditions are noted as in example 1. 361.1 g of water are extracted.

The polymer dispersion obtained then is characterized by the following variables:

dynamic viscosity of the product: $\eta_1$=21,200 mPa.s.

dynamic viscosity of a 1% solution of the polymerizate in water: $\eta_2$=1,264 mPa.s.

flocculation value: STB II=7.8 s.

dry content: 42.8%.

This polymer dispersion is diluted by adding 82.0 g of poly-DADMAC.

The polymer dispersion obtained is characterized by the following variables:

dynamic viscosity of the product: $\eta_1$=14,120 mPa.s.

dynamic viscosity of a 1% solution of the polymerizate in water: $\eta_2$=1,136 mPa.s.

flocculation value: STB II=7.4 s.

dry content: 42.5%.

Example 2 (comparison example)

315.0 g of a 40% aqueous polydiallydimethylammonium chloride(poly-DADMAC) solution, 67.5 g of acrylamide, 93.8 g of a 80% aqueous 2-trimethylammonium ethyl acrylate chloride solution, 7.5 g of lauryl acrylate and 516.2 g of water are degased in a reaction vessel with $N_2$ and heated to 53° C. while stirring. Then 0.015 g of 2,2'-azobis[2-(2-imidazoline-2-yl)-propane] (AIP), dissolved in 0.125 g of water, are added. After three hours of stirring, the temperature is raised to 65° C. and another 0.15 g AIP, dissolved in 1.35 g of water, are added.

The polymerization is terminated after another hour.

The system is characterized by the following variables:

The dynamic viscosity of the aqueous polymer dispersion is $\eta_1$=11,550 mPa.s.

The dynamic viscosity of a 1% aqueous solution of the polymerizate is $\eta_2$=1,616 mPa.s.

The flocculation value is: STB II=8.5 s.

The molecular weight of the polymerizate is $M_w$>$10^6$ Dalton.

Dry content: 27.6%.

Then water is extracted from the finished product by means of a vacuum distillation. The distillation conditions are:

pressure: 50–100 mbar temperature: 70° C.

226 g of water are extracted.

The system obtained then is characterized by the following variables:

The dynamic viscosity of the aqueous polymer dispersion is $\eta_1$=31,320 mPa.s.

The dynamic viscosity of a 1% aqueous solution of the polymerizate is $\eta_2$=1,640 mPa.s.

The flocculation value is: STB II=7.4 s.

Dry content: 40.3%

Example 3 (comparison example)

342.5 g of a 40% aqueous poly-DADMAC solution, 97.0 g of acrylamide, 125.0 g of a 80% aqueous 2-trimethylammonium ethyl acrylate chloride solution, 3.0 g of ethylhexyl acrylate and 432.5 g of water are degased in a reaction vessel with $N_2$ and heated to 56° C. while stirring.

Then 0.02 g of 2,2'-azobis[2-(2-imidazoline-2-yl)-propane] (AIP), dissolved in 0.18 g of water, are added. After two hours of stirring, the temperature is raised to 70° C. and another 0.2 g of AIP, dissolved in 1.8 g of water, are added.

The polymerization is terminated after another hour. Now in a second step 333.0 g of poly-DADMAC are stirred into the polymer dispersion.

The system is characterized by the following variables:

The dynamic viscosity of the aqueous polymer dispersion is $\eta_1$=9,080 mPa.s.

The dynamic viscosity of a 1% aqueous solution of the polymerizate is $\eta_2$=2,144 mPa.s.

The flocculation value is: STB II=5.2 s.

The molecular weight of the polymerizate is $M_w$>$10^6$ Dalton.

Dry content: 35.3%.

Then water is extracted from the finished product by means of a vacuum distillation. The distillation conditions are noted as in example 1. 262.9 g of water are extracted.

The polymer dispersion obtained then is characterized by the following variables:

dynamic viscosity of the product: $\eta_1 = 26{,}560$ mPa.s.

dynamic viscosity of a 1% aqueous solution of the polymerizate: $\eta_2 = 2{,}548$ mPa.s.

flocculation value: STB II = 5.0 s.

dry content: 44.0%.

Example 4 (comparison example)

472.5 g of a 40% aqueous poly-DADMAC solution, 101.3 g of acrylamide, 140.7 g of a 80% aqueous 2-trimethylammonium ethyl acrylate chloride solution, 11.3 g of lauryl acrylate and 274.2 g of water are degased with $N_2$ in a reaction vessel and heated to 53° C. while stirring.

Then 0.022 g of 2,2'-azobis[2-(2-imidazoline-2-yl)-propane) (AIP), dissolved in 0.2 g of water, are added. The charge thickens in a short period to the effect that no more stirring is possible. The charge is terminated.

We claim:

1. A process for the preparation of an aqueous low viscosity water soluble polymer dispersion having a high concentration of active substance, said aqueous dispersion containing a polymer A synthesized from the following monomeric components a1) 99 to 70% by wt. of at least one water-soluble monomer, a2) 1 to 30% by wt. of at least one hydrophobic monomer, and a3) 0 to 20% by wt. of at least amphiphilic monomer, wherein the sum of monomer components a1), a2) and a3) is 100% by wt. and polymer A has a weight average molecular weight of at least $5 \times 10^6$ Dalton, comprising the steps of:

preparing an aqueous dispersion PD from said polymer A and at least one polymeric dispersing agent;

extracting water from said aqueous dispersion PD to form an aqueous concentrated dispersion PD'; and adding to said aqueous concentrated dispersion PD' said at least one polymer dispersing agent.

2. The process of claim 1, wherein said extracting step and said adding step are repeated in succession.

3. The process of claim 1, wherein said polymer dispersing agent is a polyelectrolyte having a weight average molecular weight less than $5 \times 10^5$ Dalton.

4. The process of claim 1, wherein at least one of said water-soluble monomer contains an ionic group.

5. The process of claim 1, wherein said hydrophobic monomer is a compound having formula I

wherein $R_1$ is hydrogen or $C_{1-4}$ alkyl and $R_2$ is $C_{1-4}$ alkyl, $C_{5-12}$ cycloalkyl, $C_{6-12}$ aryl or —C(O)—Z—$R_3$, where $R_3$ is $C_{1-8}$ alkyl, $C_{5-12}$ cycloalkyl or $C_{6-12}$ aryl and Z is O, NH or $NR_3$.

6. The process of claim 1, wherein said amphiphilic monomer is a compound having formula II

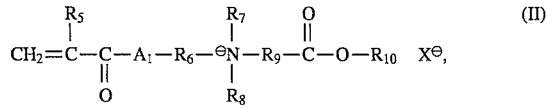

wherein $A_1$ is O, NH or $NR_4$ where $R_4$ is $C_{1-4}$ alkyl, $R_5$ is hydrogen or methyl, $R_6$ is $C_{1-6}$ alkylene, $R_7$ and $R_8$, independently, are $C_{1-6}$ alkyl, $R_9$ is $C_{1-6}$ alkylene, $R_{10}$ is $C_{8-32}$ alkyl, $C_{8-32}$ aryl or $C_{8-32}$ aralkyl, and X is halogen, pseudohalogen, acetate or $SO_4CH_3$.

7. The process of claim 1, wherein said amphiphilic monomer is a compound having formula III

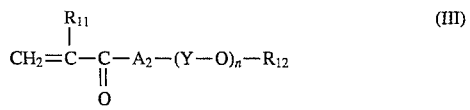

wherein $A_2$ is O, NH or $NR_{13}$ where $R_{13}$ is $C_{1-4}$ alkyl, $R_{11}$ is hydrogen or methyl, $R_{12}$ is $C_{8-32}$ alkyl, $C_{8-32}$ aryl or $C_{8-32}$ aralkyl, Y is $C_{2-6}$ alkylene, and n is an integer from 1 to 50.

8. The process of claim 1, wherein said dispersing agent is a polyalkylene ether having $C_{2-6}$ alkylene groups.

9. In a method of flocculating electrically charged particles suspended in a fluid, the improvement comprising flocculating said charged particles by contacting said charged particles with the polymer dispersion of claim 1.

10. In a method for manufacturing paper by adding a retention agent thereto, the improvement comprising adding the polymer dispersion of claim 1.

11. In a process for dewatering a substrate, the improvement comprising contacting said substrate with the polymer dispersion of claim 1.

12. In a process for conditioning soil, the improvement comprising adding to said soil the polymer dispersion of claim 1.

* * * * *